US012741684B2

(12) United States Patent
Bulle et al.

(10) Patent No.: US 12,741,684 B2
(45) Date of Patent: Sep. 22, 2026

(54) HAND TRUCK

(71) Applicant: Lockdown Securities, Inc., Colorado City, CO (US)

(72) Inventors: Shawn M. Bulle, Seligman, AZ (US); Marshall R. Bulle, Rye, CO (US)

(73) Assignee: Lockdown Securities, Inc., Colorado City, CO (US)

( * ) Notice: Subject to any disclaimer, the term of this patent is extended or adjusted under 35 U.S.C. 154(b) by 268 days.

(21) Appl. No.: 18/388,248

(22) Filed: Nov. 9, 2023

(65) Prior Publication Data

US 2024/0157990 A1 May 16, 2024

Related U.S. Application Data

(60) Provisional application No. 63/424,366, filed on Nov. 10, 2022.

(51) Int. Cl.
*B62B 1/22* (2006.01)
*B62B 1/00* (2006.01)

(52) U.S. Cl.
CPC ................ *B62B 1/22* (2013.01); *B62B 1/008* (2013.01)

(58) Field of Classification Search
CPC ................................. B62B 1/22; B62B 1/008
See application file for complete search history.

(56) References Cited

U.S. PATENT DOCUMENTS 2,778,516 A * 1/1957 Knight .................... B62B 1/264 414/457
4,570,953 A * 2/1986 McPeak .................. B62B 5/023 280/5.3
D327,761 S * 7/1992 Stanfield ........................ D34/24
5,738,480 A * 4/1998 Butzen ...................... B62B 1/14 414/490

(Continued)

FOREIGN PATENT DOCUMENTS

CN 207189429 U * 4/2018
GB 2362372 A * 11/2001 ............. B62B 5/028
JP H03259899 A * 11/1991

OTHER PUBLICATIONS

GB-2362372-A English Translation (Year: 2001).*
JP-H03259899-A English Translation (Year: 1991).*
CN-207189429-U English Translation (Year: 2018).*

*Primary Examiner* — Michael T. Walsh
(74) *Attorney, Agent, or Firm* — Dicke, Billig & Czaja, PLLC

(57) ABSTRACT

An improved hand truck is provided and generally characterized by a chassis, a wheel assembly, an outrigger assembly, a platform and a platform lift assembly. The chassis includes a base bracket and support bars longitudinally extending therefrom in spaced apart condition, the wheel assembly operably depending from the base bracket. The outrigger assembly includes outrigger arms rotatingly supported by a portion of the wheel assembly such that the outrigger arms are reversibly pivotable between passive and active assembly configurations. The platform, translatably (Continued)

received upon the support bars of the chassis, includes a base plate and a backer plate, the backer plate adapted to receive an accessory hanger. The platform lift assembly, for reversibly translating the platform upon the support bars of the chassis is operatively interposed between the base bracket of the chassis and the platform.

18 Claims, 11 Drawing Sheets

(56) References Cited

U.S. PATENT DOCUMENTS

| | | | | |
|---|---|---|---|---|
| 6,062,802 | A * | 5/2000 | Aenchbacher | B62B 1/14<br>414/490 |
| 7,914,017 | B2 * | 3/2011 | Setzer, Sr. | G01G 23/3735<br>280/47.17 |
| 10,214,228 | B2 * | 2/2019 | Benton | B62B 1/264 |
| 10,266,191 | B2 * | 4/2019 | McDonald | B62B 1/268 |
| 2011/0276181 | A1 * | 11/2011 | Lamb | B62B 1/14<br>414/800 |
| 2016/0096541 | A1 * | 4/2016 | Smith | B62B 1/26<br>248/201 |

* cited by examiner

HAND TRUCK

This is a United States patent application filed pursuant to 35 USC § 111(a) claiming priority under 35 U.S.C. § 120 to U.S. Pat. Appl. Ser. No. 63/424,366 filed Nov. 10, 2022 entitled IMPROVED HAND TRUCK, said application incorporated herein by reference in its entirety.

TECHNICAL FIELD

The present disclosure is generally directed to an improved hand truck or cart, and assemblies/subassemblies thereof as the case may be, to facilitate transport of loads and stable retention and/or positioning of lifted loads effectuated via an assembly of the improved hand truck. Moreover, via selective configuration of the contemplated hand truck and/or accessorizing of same, a heretofore unseen robust functional versatility is achievable.

BACKGROUND OF THE INVENTION

Hand trucks are upright wheeled carts. Such carts, also known as trollies or dollies, permit a single individual to move/transport large or heavy loads, such as boxes, crates, bins, equipment, and raw materials. Characteristic of such devices are a nose plate that supports a load, and a vertical frame that prevents the load from falling off the truck while in motion. The nose plate is slide under the load, or the load may be stacked onto the nose plate, and the truck is rearwardly tilted, the load thereby borne on the truck wheels for rolled transport of the load from one place to another.

Hand trucks are well known, and numerous. Commercially, on-line industrial equipment catalogues list close to or well in excess of 100 offerings (see e.g., "hand truck" query results for https://www.northerntool.com/and/or https://www.grainger.com/). Moreover, there is little doubt that numerous patents have issued emphasizing advantages that overcome shortcomings of then known prior devices, with form fitting function. While transport operations, namely, load particulars, commonly dictate the "style" of hand truck, the particular is the enemy of the general (to borrow from Voltaire-"the best is the enemy of the general"). Thus, it is believed desirable and advantageous to move away from uniquely special purpose solutions and toward a broad, general solution, namely, to provide a robust and versatile hand truck, for instance and without limitation, an improved hand truck having, among other things, a load lifting functionality, enhanced stability, supreme mobility and elegant simplicity.

SUMMARY OF THE INVENTION

An improved hand truck is provided and generally characterized by a chassis, a wheel assembly, an outrigger assembly, a platform and a platform lift assembly. The chassis includes a base bracket and support bars longitudinally extending therefrom in spaced apart condition, the wheel assembly operably depending from the base bracket. The outrigger assembly includes outrigger arms rotatingly supported by a portion of the wheel assembly such that the outrigger arms are reversibly pivotable between passive and active assembly configurations. The platform, translatably received upon the support bars of the chassis, includes a base plate and a backer plate upwardly extending from an edge portion thereof, the backer plate adapted to receive an accessory hanger. The platform lift assembly, for reversibly translating the platform upon the support bars of the chassis, is operatively interposed between the base bracket of the chassis and the platform.

The hand truck chassis advantageously includes a first brace bracing upper portions of the support bars, and a second brace bracing medial portions of the support bars. The platform lift assembly is carried by the chassis via the base bracket and the second brace.

The platform advantageously comprises a base plate and a backer plate, the backer plate upwardly extending from a peripheral portion of the base plate. The backer plate of the platform is translatably engaged with the support bars of the chassis, via for example opposingly paired sets of channel brackets carried by the backer, more particularly and advantageously, lined channel brackets. Moreover, the backer plate is adapted to receive the accessory hanger, as for example, via inclusion of one or more apertures that cooperatively and lockingly receive one or more knobs of a mounting plate of an accessory hanger.

Advantageously, the hand truck is further characterized by a first locking mechanism for retaining the outrigger arms of the outrigger assembly in the passive assembly configuration, and a second locking mechanism for retaining the outrigger arms of the outrigger assembly in the active assembly configuration. The first locking mechanism, a lock-in locking mechanism, comprises a tensioned latch, the second locking mechanism, a lock-out locking mechanism, comprises locking bars or plates for translated engagement with the deployed outrigger arms.

Further still, and advantageously, the hand truck is characterized by an accessory hanger for receipt of an accessory tool to engage a work piece, the accessory hanger lockingly integrated/integrateable with the platform. Moreover, a variety of accessory tools operably coupleable to/with the accessory hanger are contemplated and provided for. More specific features and advantages obtained in view of the summarized features will become apparent with reference to the drawing figures and the section captioned DETAILED DESCRIPTION.

BRIEF DESCRIPTION OF THE DRAWINGS

All figures have been prepared, and are included to facilitate and/or enhance an understanding of the basic teachings of the contemplated embodiments, and/or the concepts underlying same, and are incorporated in and constitute a part of this specification. While the drawings notionally illustrate one or more embodiments and context with respect thereto, and together with the description serve to explain principles of the embodiment(s), other embodiments and many of the intended advantages of the disclosed assemblies, subassemblies, apparatus, devices, mechanisms, and/or methodologies attendant to same, etc. will be readily appreciated as they become better understood by reference to the following detailed description and figures. It is to be noted that the elements of the drawings are not necessarily to scale relative to each other, with like reference numerals designating corresponding similar parts/structures.

FIGS. 1-11 are provided herein wherein:

FIG. 1 depicts, perspective elevation "front" view vertical orientation, a non-limiting improved hand truck embodiment, first, standard, neutral, or passive configuration characterized by a load receiving platform (deployed) wherein a nose or base plate thereof is proximal to a surface upon which the apparatus is supported, arms of an outrigger assembly retracted in a substantially vertical, locked-in posture exteriorly adjacent longitudinal support bars of a frame or chassis of the apparatus;

FIG. 2 depicts the FIG. 1 apparatus, perspective elevation "rear" view, second configuration, characterized by deployed outrigger arms, components of a platform lift assembly substantially visible;

FIG. 3 depicts the FIG. 1 apparatus, third configuration, characterized by deployed outrigger arms and a selectively elevated load receiving platform, portions of a locking (lock-out) mechanism for the outrigger arms of the outrigger assembly visible, the load receiving platform translatable upon the longitudinal support bars of the frame or chassis of the apparatus;

FIG. 4 contextually illustrates the FIG. 1 apparatus in a non-limiting advantageous load carrying application/transfer operation, deployed outrigger arms operatively received by a pallet, the pallet supported load initially received upon the nose of the selectively elevated load receiving platform in furtherance of removing the load from the pallet;

FIG. 5 depicts the FIG. 1 apparatus, view as FIG. 3, equipped with an accessory hanger or bracket, the accessory hanger operatively received upon/at a portion of the load receiving platform;

FIG. 6 depicts the FIG. 5 apparatus equipped/accessorized with a set of arms, more particularly, and without limitation, arms characterized by rollers for engaging a load (e.g., a vehicle tire during change out, or a work piece (e.g., plank) for infeeding to a work station (e.g., a saw)), the selectively elevated load receiving platform in a first, neutral or passive posture, as FIG. 1, for readied receipt of the load upon the accessory arms, and selectively thereafter, as the case may be, lifting/elevating of the load borne upon the rollers;

FIG. 7 depicts the FIG. 5 apparatus equipped/accessorized with a hitch connector accessory, a shank of the hitch connector accessory pivotable via a pitch adjustment mechanism, the selectively elevated load receiving platform depicted in an elevated condition;

FIG. 8 depicts the FIG. 7 apparatus wherein a hitch is received by the hitch connector accessory, the hitch selectively positioned for trailer engagement via actuation of the selectively elevated load receiving platform;

FIG. 9 depicts the FIG. 5 apparatus equipped/accessorized with a set of arms, more particularly, and without limitation, arms characterized by indexingly pivotable, locking free end segments to aid load retention when inwardly configured, a tree/plant pot shown as an illustrative, non-limiting load example, the selectively elevated load receiving platform in a partially elevated posture not inconsistent with the apparatus posture of FIG. 4;

FIG. 10 depicts the FIG. 5 apparatus, rear view, accessorized with forks selectively equipped with clamps to aid elevated load stability, a circuit breaker enclosure shown as an illustrative, non-limiting load example, the selectively elevated load receiving platform in a substantially elevated posture in furtherance of installing the enclosure; and, FIG. 11 depicts the FIG. 10 apparatus, front view, portions generalized so as to better show the forks and clamps supported thereby.

DETAILED DESCRIPTION

Figure 1:
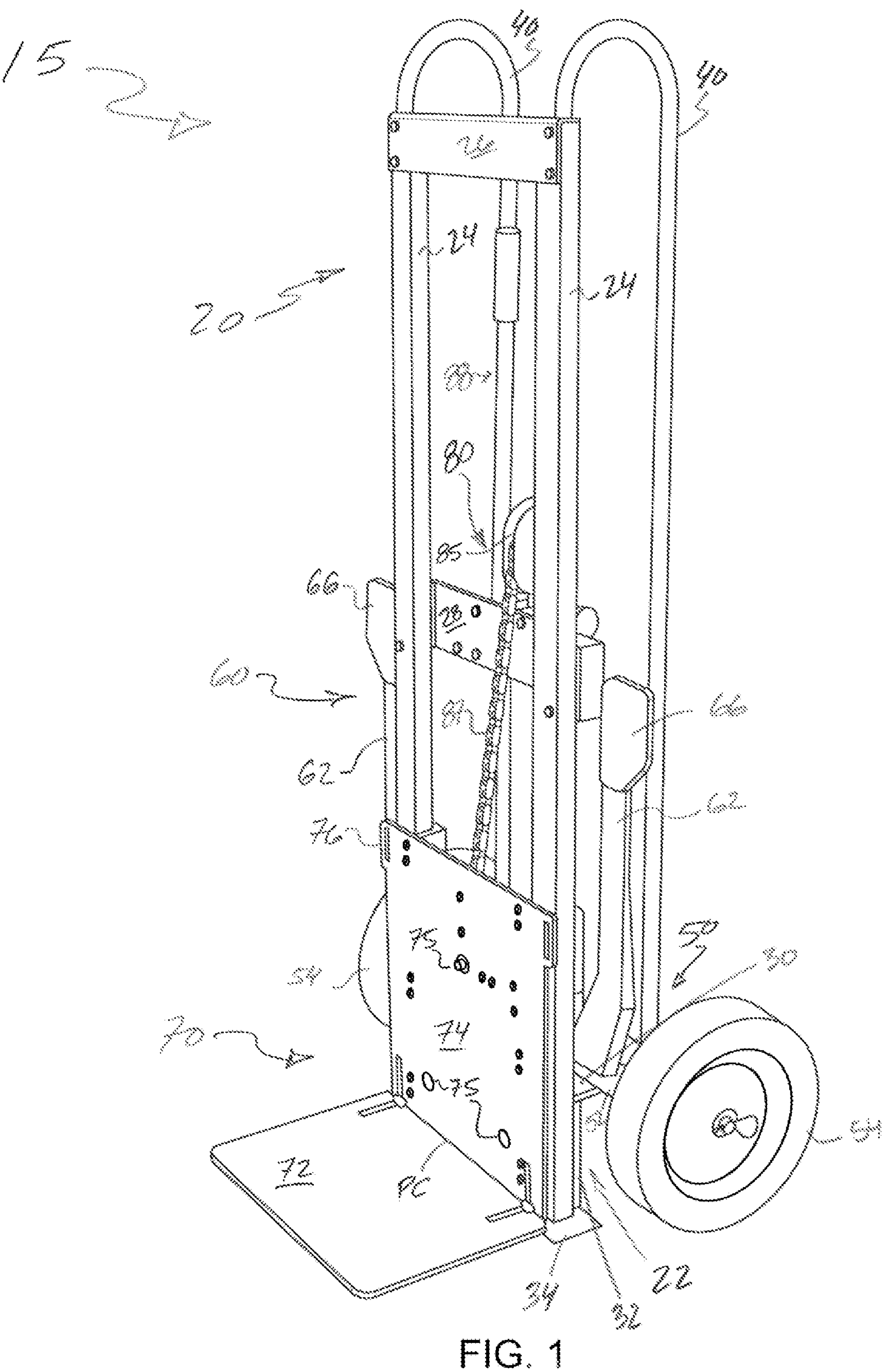

A contemplated, non-limiting, advantageous novel apparatus, including assemblies, structures, and/or subassemblies thereof, are notionally provided for. As to the instant disclosure, it commences with an overview the improved hand truck (FIGS. 1-3), with select features, particulars, functions, and or operational modes of the apparatus/apparatus assemblies thereafter noted (FIGS. 4-11).

A contemplated non-limiting hand truck 15 is fairly and generally characterized by a frame or chassis 20, hand rails 40, a wheel assembly 50, an outrigger assembly 60, a translatable load receiving platform 70, and a platform lift assembly 80, each of which will be described hereinafter. Moreover, as will be subsequently taken up, locking mechanisms are advantageously but not necessarily provided in relation to outrigger arms of the outrigger assembly, and further still, a supremely advantageous accessory hanger or bracket for support a variety of accessory tools for engaging a retained load, or workpiece as the case may be, is provided, the accessory hanger quickly and readily lockingly supported by a portion of the platform of the apparatus.

Figure 2:
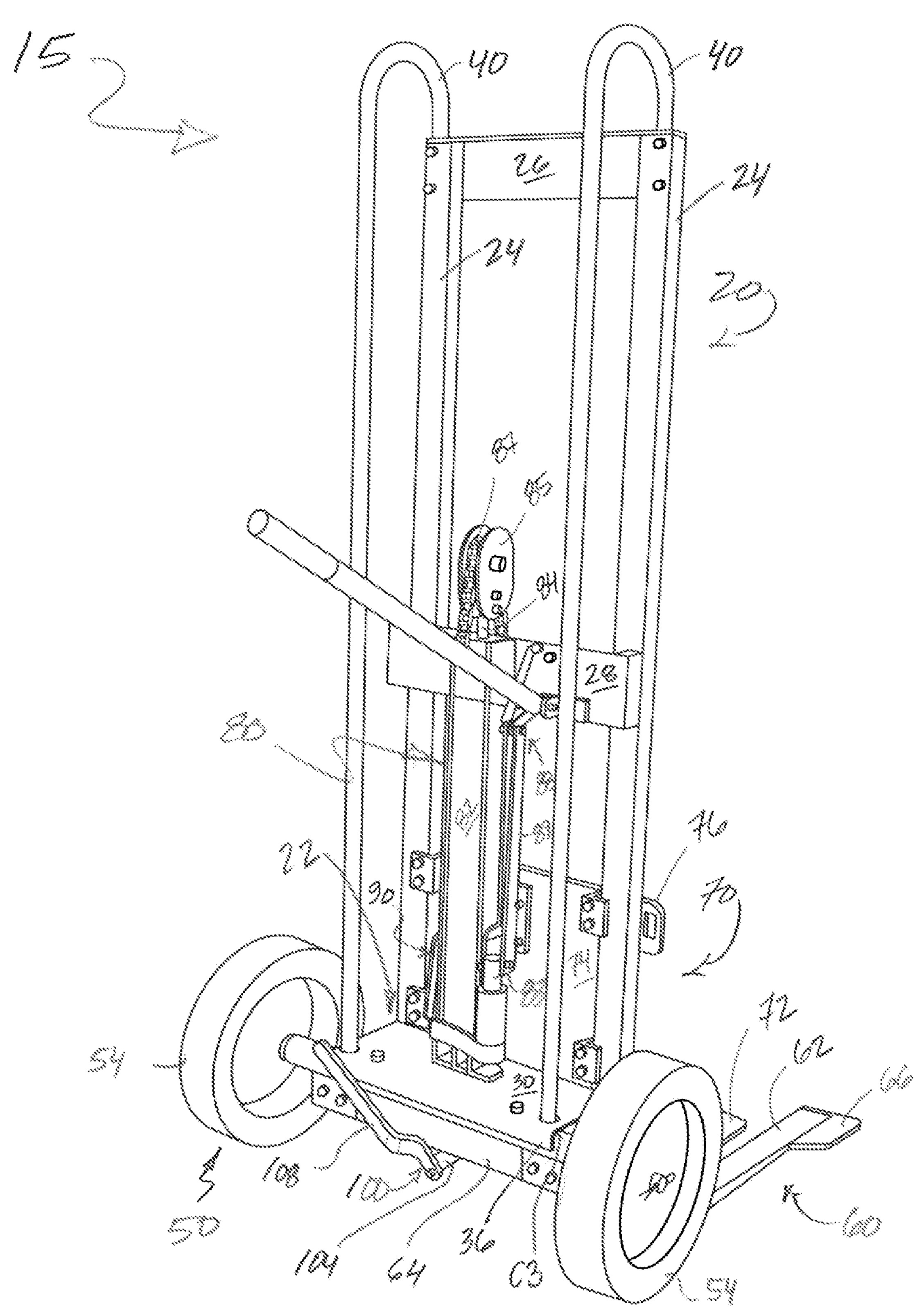
Figure 3:
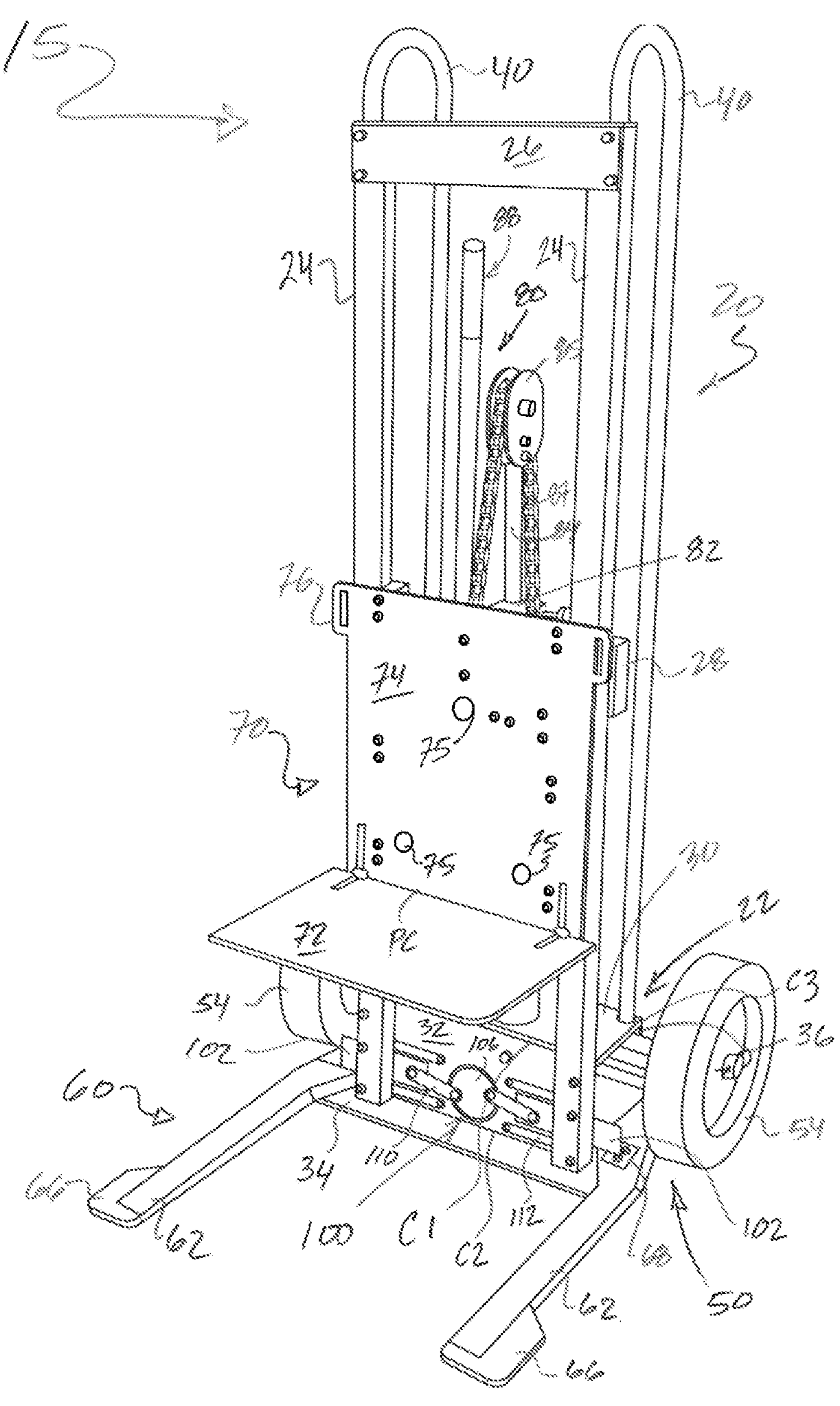
Figure 4:
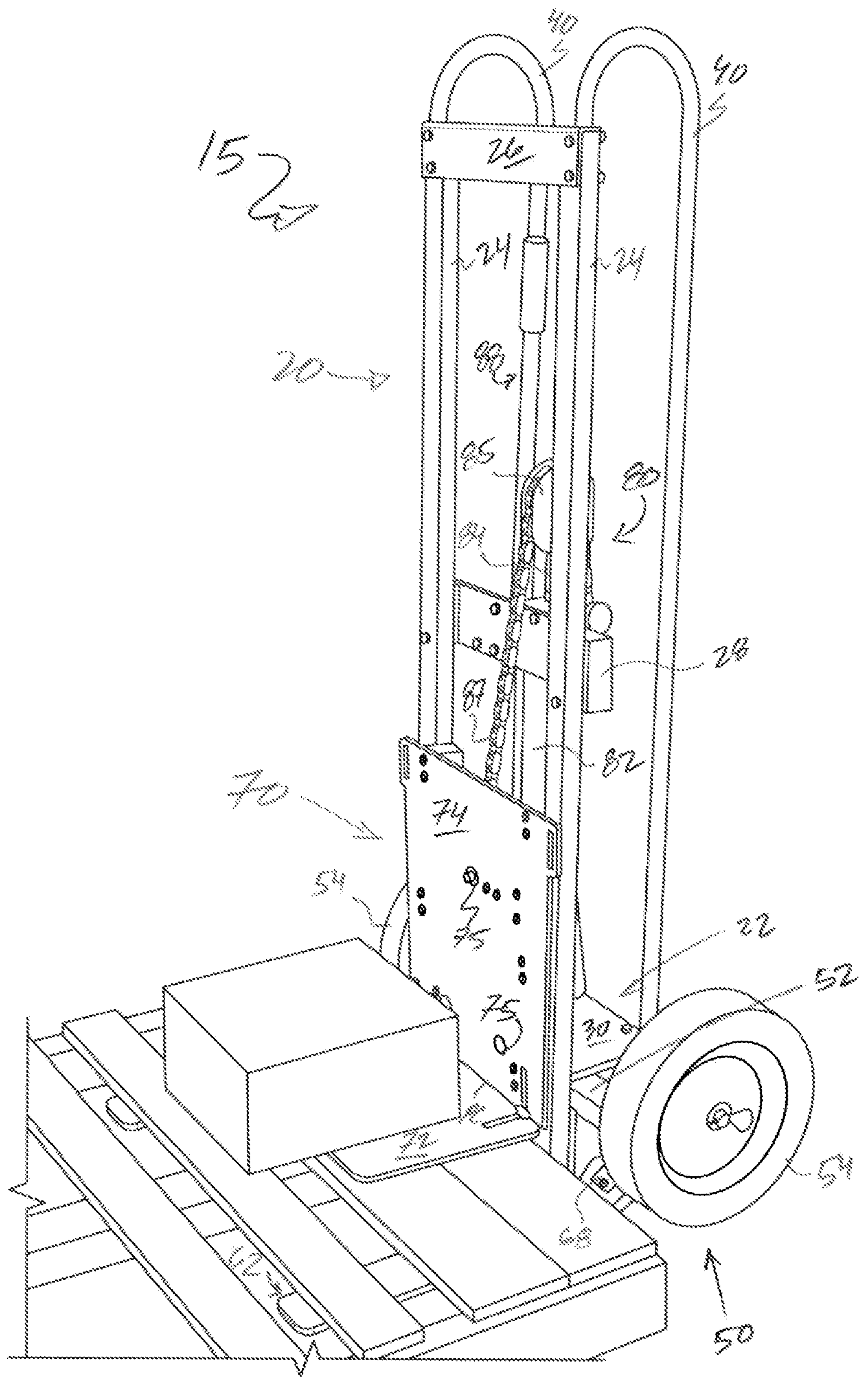

With general reference to FIGS. 1-3, and particular reference to FIG. 2, depicted frame or chassis 20 of hand cart 15 is generally characterized by a base bracket 22 and support bars 24 longitudinally extending therefrom in spaced apart condition. Chassis 20 further advantageously includes a first brace for bracing and/or uniting upper portions of the support bars, and a second brace for bracing and/or uniting medial portions of the support bars, for example, upper brace 26 and medial brace 28 as shown (e.g., FIGS. 1 & 2).

Base bracket 22, FIG. 2 rear view, FIG. 3 front view, in addition to bracing the lower portions of the longitudinal support bars, notionally supports, anchors or otherwise engages other apparatus elements and/or assemblies and/or their components. For example, without limitation and as is generally shown and/or appreciated FIGS. 1-3: hand rails 40, wheel assembly 50, a portion of outrigger assembly 60, locking mechanisms (i.e., lock-in 90, lock-out 100) associated with the outrigger assembly/outriggers arms thereof, and platform lift assembly 80.

Advantageously, but not necessarily, base bracket 22 is fashioned as a unitary element and is fairly characterized by adjacent primary bracket surfaces, namely a primary horizontal bracket surface 30 and a primary vertical bracket surface 32, each of which extend from a first bracket crotch C1 as shown (FIG. 3). Moreover, base bracket 22 is further fairly characterized by subordinate secondary bracket surfaces, namely, a secondary horizontal bracket surface 34 and a secondary vertical bracket surface 36, the former extending from primary vertical bracket surface 32 at a second bracket crotch C2, the later extending from primary horizontal bracket surface 30 at a third bracket crotch C3 as shown FIG. 3 & FIG. 2 respectively. As is best appreciated with reference to FIG. 1 (note also FIG. 3), secondary horizontal bracket surface 34 forms a stand (i.e., ground engaging element) for the hand cart in a conventional upright vertical posture for same. Moreover, longitudinal support bars 24, at their lower end portions, are united with or joined to primary vertical bracket surface 32 and extend upwardly therefrom, more particularly, bars 24 extend upwardly from third bracket crotch C3 (FIG. 3).

With continued reference to FIGS. 1-3, hand rails 40 upwardly extending from upper portions of spaced apart support bars 24 and bendingly return toward and to base bracket 22. More particularly as shown, the cane-shaped (c-cane) hand rails upwardly extend from first ends anchored at or to primary horizontal bracket 30, a "handle" thereof (i.e., the c-bend) forming an upper most extent of the hand cart, second ends thereof anchored at or to the upper end portions of support bars 24, advantageously but not necessarily as shown, at or to the upper end portions of support bars 24 in combination with upper brace 26.

With particular reference to FIG. 2 (note also FIG. 10), non-limiting wheel assembly 50 of the illustrated hand cart is shown depending from brace bracket 22. More particularly, a structural support or element 52 (e.g., an axle, a shaft, a tube, a bar, etc.) of wheel assembly 50 is advantageously operatively supported at or in relation to third crotch C3 of brace bracket 22 so as to extend there along. Wheels 54 of wheel assembly 50 are in turn operatively supported and retained at the free ends of structural element 52 for rotation via bearings or the like.

Outrigger assembly 60, as is best appreciated with reference to FIGS. 1-3, is characterized by outrigger arms 62 rotatingly supported by a portion of the wheel assembly such that the outrigger arms are reversibly pivotable between passive (P) and active (A) hand truck configurations. More particularly, outrigger arms 62 are rotatingly supported upon structural element 52 of wheel assembly 50, each outrigger arm inward adjacent a wheel 54 of wheel assembly 50. Outrigger assembly 60 further includes a bar 64 or the like (FIG. 2) that unites the outrigger arms adjacent their connection point with the structural component of wheel assembly, and as such, the outrigger assembly is thusly rotatable. Advantageously, but not necessarily, the free end portions of outrigger arms 62 are characterized by pads 66.

Passive configuration P for outrigger assembly 60 is characterized by outrigger arms 62 upwardly extending and positioned relative to chassis 20 so as to be outward adjacent and parallel to support bars 24, and fore to aft, intermediate support bars 24 and hand rails 40 (FIG. 1). The base bracket includes a lock-in locking mechanism, namely a tensioned latch 90, for engagement with bar 64 of outrigger assembly 60 so as to retain outrigger arms 62 in the upright posture or condition, a "lock-in" scenario for the outrigger arms.

Active, deployed configuration A for outrigger assembly 60, enabled by release of tensioned latch 90, is characterized by outrigger arms 62 forwardly extending and positioned relative to chassis 20 so as to be generally outward adjacent, parallel and coplanar to/with secondary horizontal surface 34 of base bracket 22 (FIG. 2 (compare FIG. 1) & FIG. 3). While an unencumbered deployment is contemplated, i.e., upon release of the lock-in latch the outrigger assembly freely rotates, a regulated (e.g., dampened) deployment may be desirable via suitable adaptation. Base bracket 22 further includes lock-out locking mechanism 100 for retaining the outrigger arms in a deployed posture or condition, a "lock-out" scenario for the outrigger arms.

Lock-out locking assembly 100 advantageously, but not necessarily, is characterized by locking bars (i.e., hold down plates) 102 for translated engagement with the deployed outrigger arms. For instance and as is generally shown (FIGS. 2 & 3), the lock-out locking assembly 100 further includes a sleeved shaft 104 supporting a rotatable disc 106 at a first end thereof and a lever or handle 108 at a second end thereof, and links 110 that operatively join locking plates 102 to rotatable disc 106.

As is best appreciated with reference to FIG. 3, rotatable disc 106 of lock-out locking mechanism 100 occupies a central through hole of primary vertical surface 32 of base bracket 22, a surface thereof generally co-planar with the primary vertical surface. Locking plate guides in the form of spaced apart bars 112 and slots (not shown) of primary vertical bracket surface 32 of base bracket 22 control and limit travel, respectively, of locking plates 102. Free ends of the locking plates are frictionally received upon a portion of outrigger arms 62, for instance as shown, at wear tabs 68 thereof. A travel path for the outwardly extendable hold down plates has them passing between primary vertical bracket surface 32 and support bars 24 of chassis 20.

Figure 9:
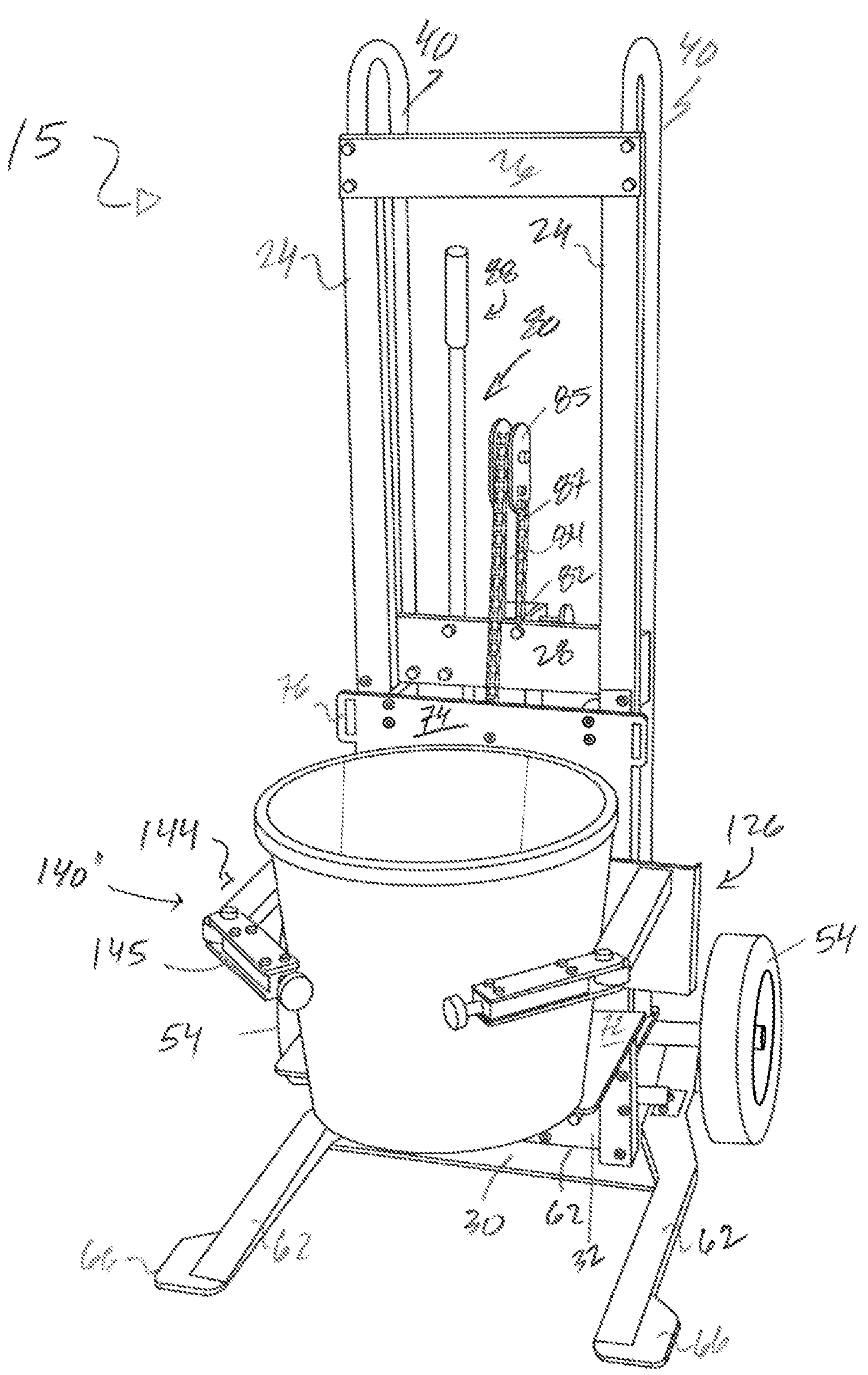

With particular reference to FIGS. 1 & 2, platform 70, a translatable load receiving platform, is generally characterized by base plate 72 (i.e., a nose) for underlying a load, and backer plate 74 for supplemental receipt of the load (FIG. 1, & FIG. 9 with load). Backer plate 74 upwardly extends from a peripheral portion of base plate 72, more particularly, backer plate 74 upwardly extends from an edge portion of base plate 72 to thereby delimit a platform crotch (PC), the platform having an L-shape in side elevation view. Generally, but not necessarily, the backer plate extends a greater distance than the nose with reference to the crotch.

Backer plate 74 is advantageously but not necessarily adapted to include anchor elements to facilitate load strapping, e.g., apertured tabs 76 laterally extend from an upper margin or segment of backer plate 74 as is generally shown (FIG. 1). Moreover, backer plate 74 is advantageously adapted to support an accessory hanger or bracket 120 (see e.g., FIG. 5), more particularly, to include, for example, a select pattern of through holes 75 for receipt of mating elements of accessory hanger 120. Further still and advantageously, a tensioned slide lock/latch 78 is supported on a rear surface of backer plate 74 adjacent the central or apex through hole for engagement with a select mating element, a central mating element, of the hanger assembly so as to thereby lockingly retain the hanger assembly thereupon or thereto.

Translatable load receiving platform 70 is slidingly supported upon support bars 24 of chassis 20 via one or more sets of paired channel elements 77 carried by backer plate 74 (FIG. 2, see also FIG. 10), each channel element is advantageously equipped with suitable liner material to facilitate reliable, repeated and long lived platform translation in relation to the support bars. Moreover, and advantageously, liner material is suitably supported by the backer plate, in the vicinity of the nose, for engagement with the longitudinal support bars.

Figure 10:
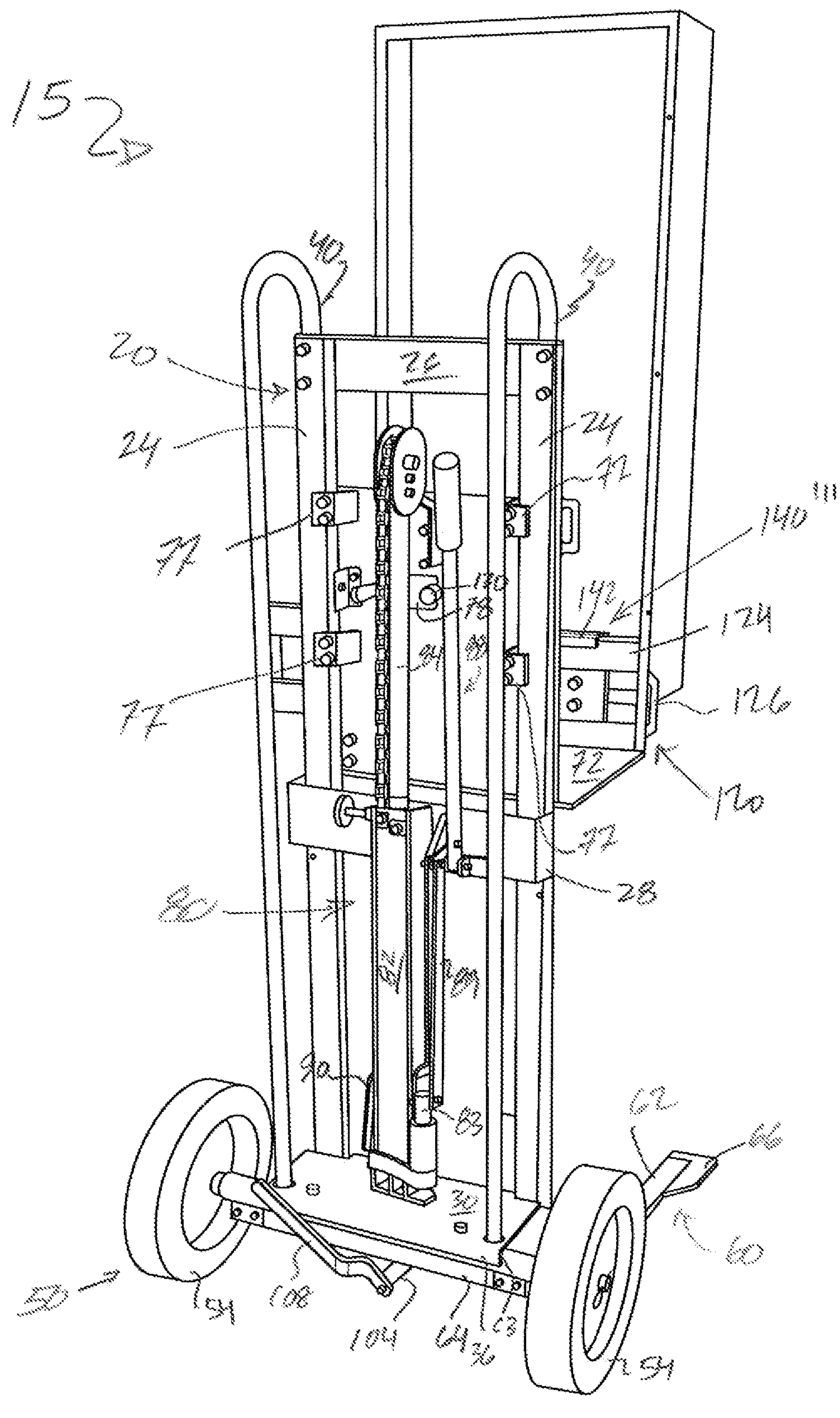

As is best appreciated with reference to FIG. 2 and FIG. 10, platform lift assembly 80 operatively links platform 70 with chassis 20 in furtherance of selectively raising/lowering platform 70, more particularly a loaded platform. Platform lift assembly 80 generally comprises, as shown and without limitation, a conventional hydraulic assembly characterized by, among other things, a sealed barrel or tube 82, a rod 84 extendable from barrel 82, a platform linkage 86 uniting rod 84 with platform 70, more particularly, backer plate 74 thereof, and an actuator 88 operatively linked to barrel 82 in furtherance of advancing rod 84 therefrom. While the actuator may take a variety of forms, a lever or handle attached to a plunger 83 associated with barrel 82, via tensioned link bar 89, is provided as is generally shown.

Barrel 82 is supported by chassis 20 at base bracket 22 and medial chassis brace 28. More particularly, barrel 82 upwardly extends from the primary horizontal surface of the base bracket, to the medial chassis brace, the rod upwardly extendable therefrom. Platform linkage 86 advantageously, but not necessarily is characterized by a sprocket 85 and a chain 86 carried thereabout. Sprocket 85 is supported at the free end of rod 84, with opposing ends of chain 86 anchored at backer plate 74 of platform 70, and at or about the distal free end of barrel 82 via a bracket or the like directly or indirectly supported by a portion of chassis 20. As to actuation of the platform lift, a 2:1 travel aspect is believed advantageous, namely, for every one inch of piston travel effectuated via handle pivoting, a two inch platform travel results.

Finally, in connection to the heretofore identified hand cart elements, the accessory hanger or bracket (FIG. 5), and accessory tools of FIGS. 6-11 are taken up. As was previously noted, an especially advantageous and desirable feature of the heretofore described hand cart is an ability to quickly and reliably equip same with a variety of accessory tools via a novel hanger or bracket that is readily attached to the platform of the device, more particularly, the back plate thereof. In addition providing versatility and a robustness to lifting, lifting/moving operations, such accessory tools offer support for work pieces that are intended to be operated upon so as to function as "helping hands" if you will.

Figure 5:
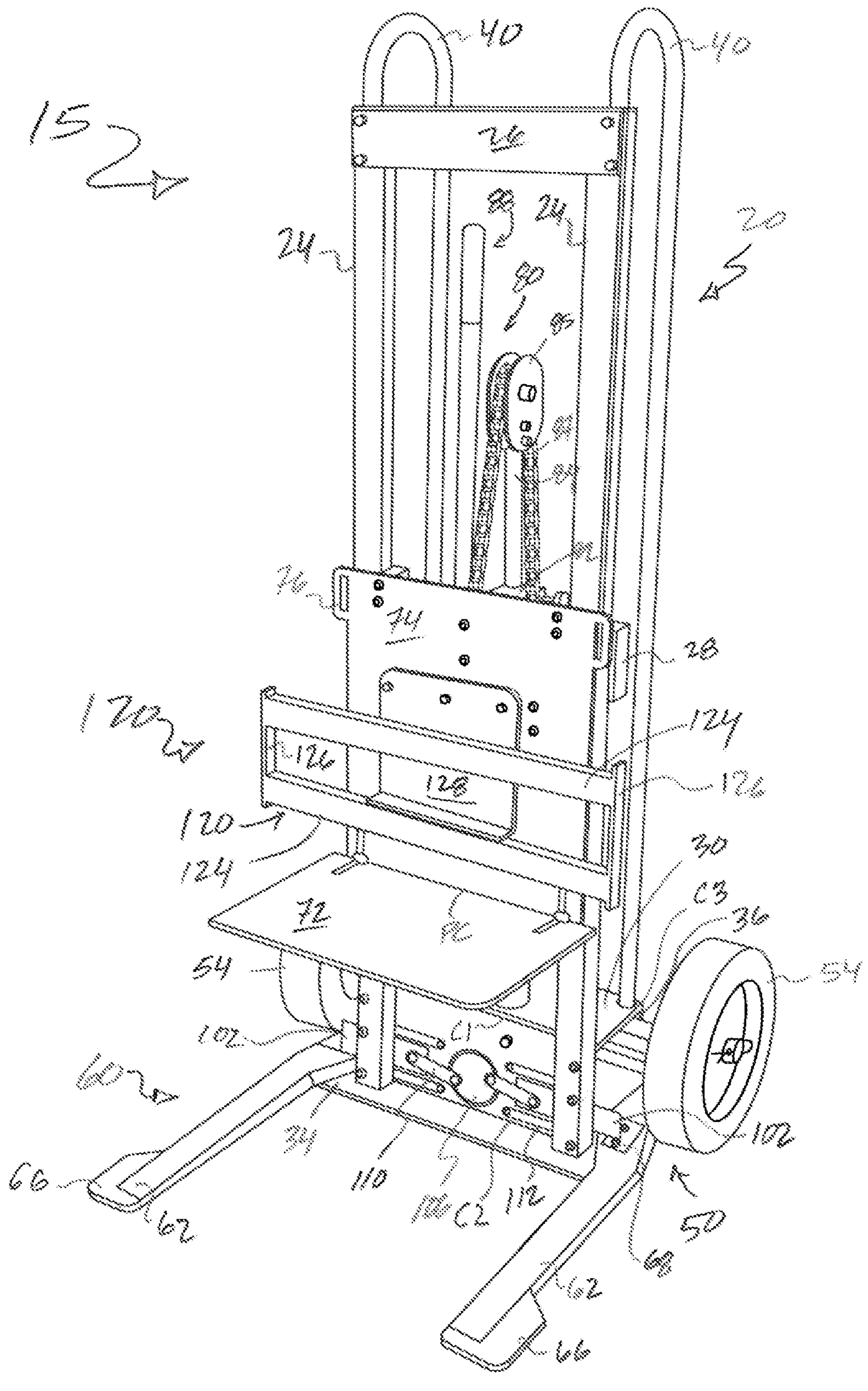

With particular reference now to FIG. 5, and comparison to FIG. 3, accessory hanger 120 is generally characterized by a frame 122 and a mounting plate 128. Frame 122 includes paired, spaced apart bars or rails 124 united at their free end portions with paired end braces 126 or the like. Mounting plate 128 is affixed generally intermediate the end portions of frame 122 of hanger 120, and includes a surface adapted for cooperative engagement with through holes 75 of backer plate 74 of platform 70, for example and without limitation, via the inclusion of knobs 130 or the like provided in a pattern corresponding to the backer plate through holes. In connection to an apex interface for/of the hanger and the platform, a knob of the hanger mounting plate is adapted for latched capture by tensioned latch 78 carried by backer plate 74 of platform 70 proximal to the apex through hole. Via such arrangement of elements and their interrelationship, the hanger is quickly and reliable secured to the platform.

Having set out noteworthy assemblies and features of/for the instant improved hand truck, attention is next and finally directed to device functionality. More particularly, and as enabled by the advantageous accessory bracket heretofore described and generally shown, non-limiting accessory tools are taken up in connection to those depicted FIGS. 6, 7/8, 9 & 10/11.

Figure 6:
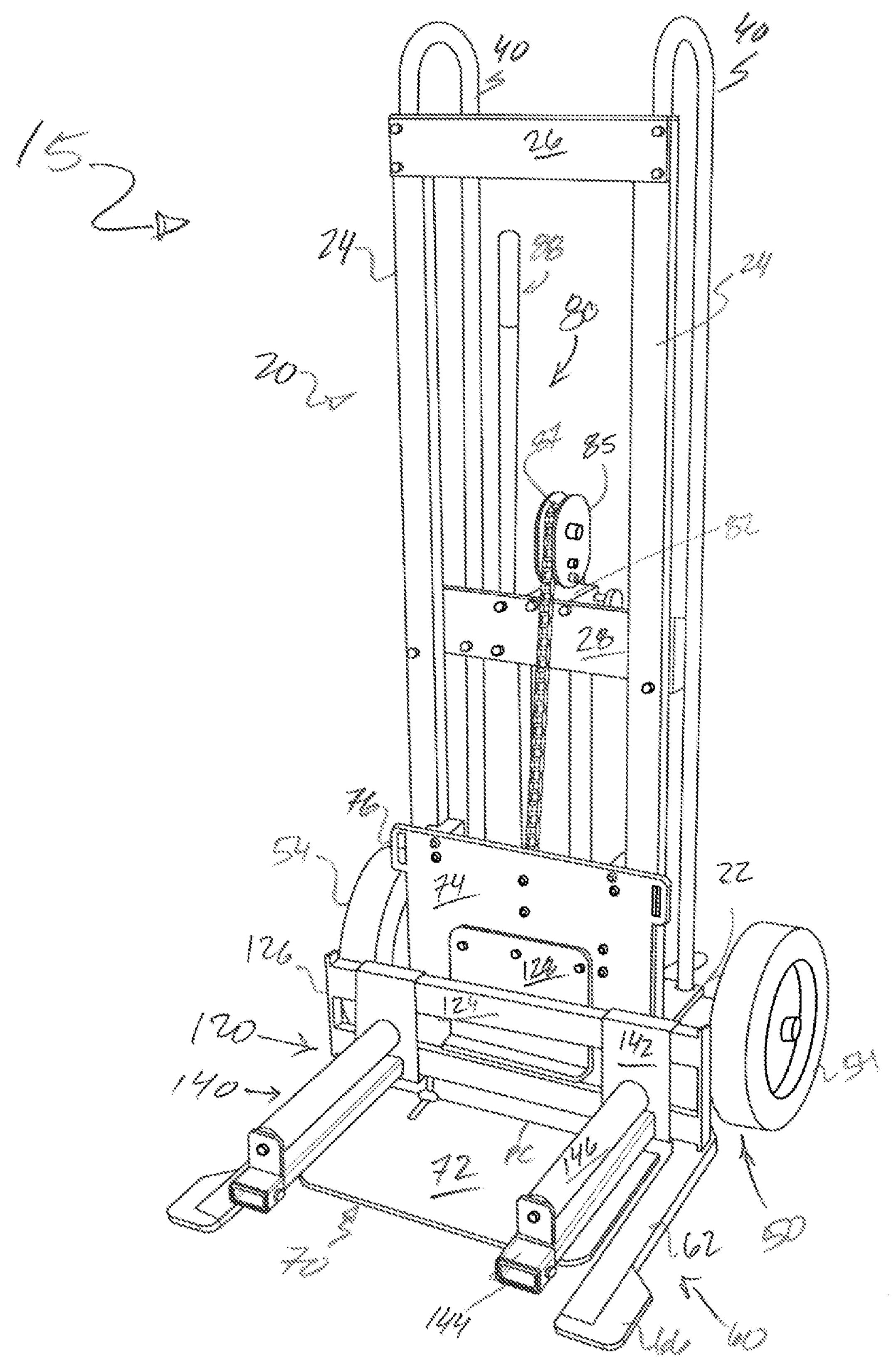

With reference to FIG. 6, a first non-limiting accessory tool set is shown, namely, an accessory tool 140 characterized by a bracket 142 and arm 144 extending therefrom, arm 144 equipped with a roller 146. As should be readily appreciated, the tool is received upon the accessory hanger via an upper portion of the bracket, the upper bracket portion being turned in and down so as to form a channel for receipt of the upper bar of the accessory hanger. By way of non-limiting illustration, the instant tool advantageously supports a cumbersome vehicle wheel during a tire change operation, or planking being infed to a sawing or drilling operation.

Figure 7:
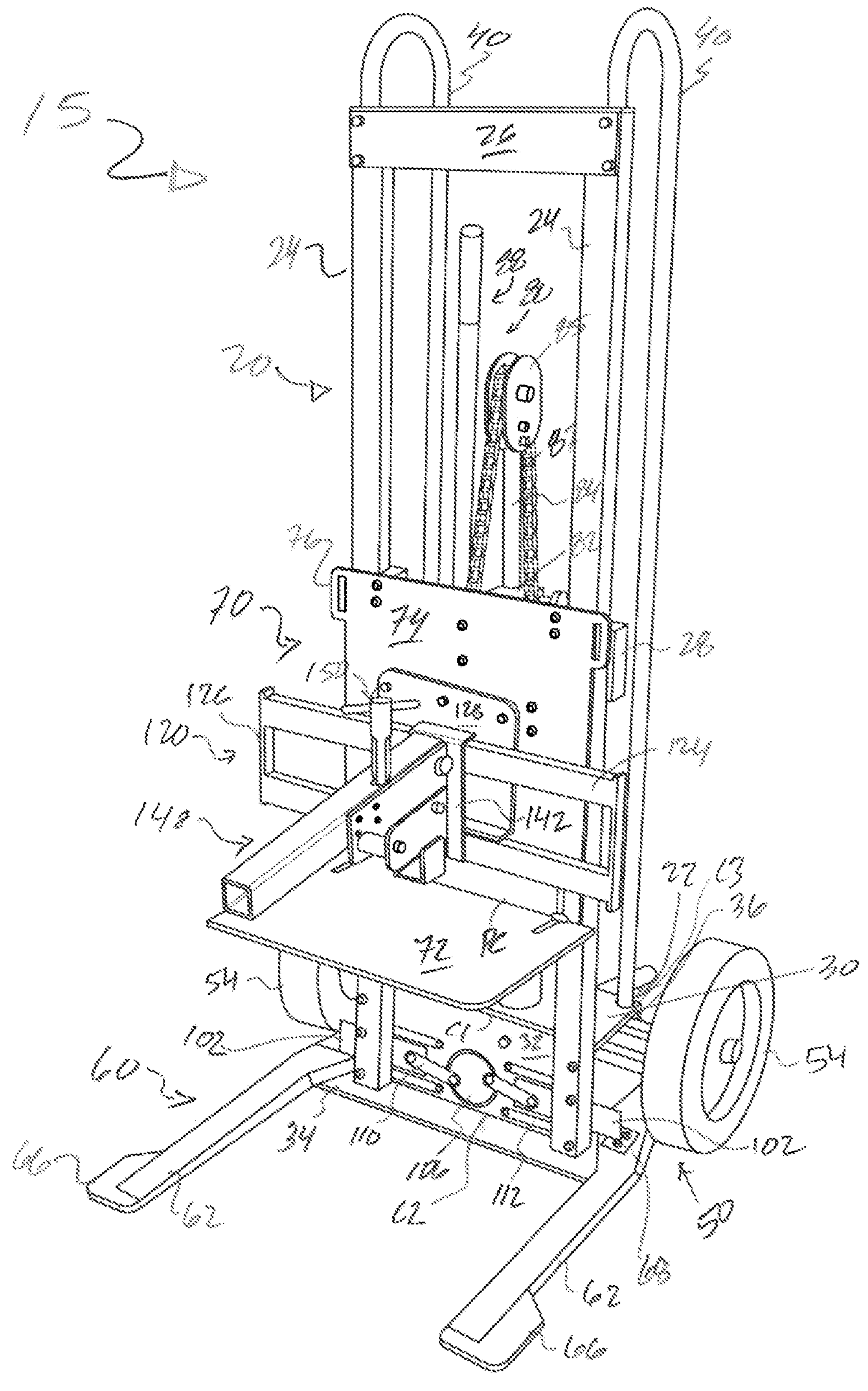
Figure 8:
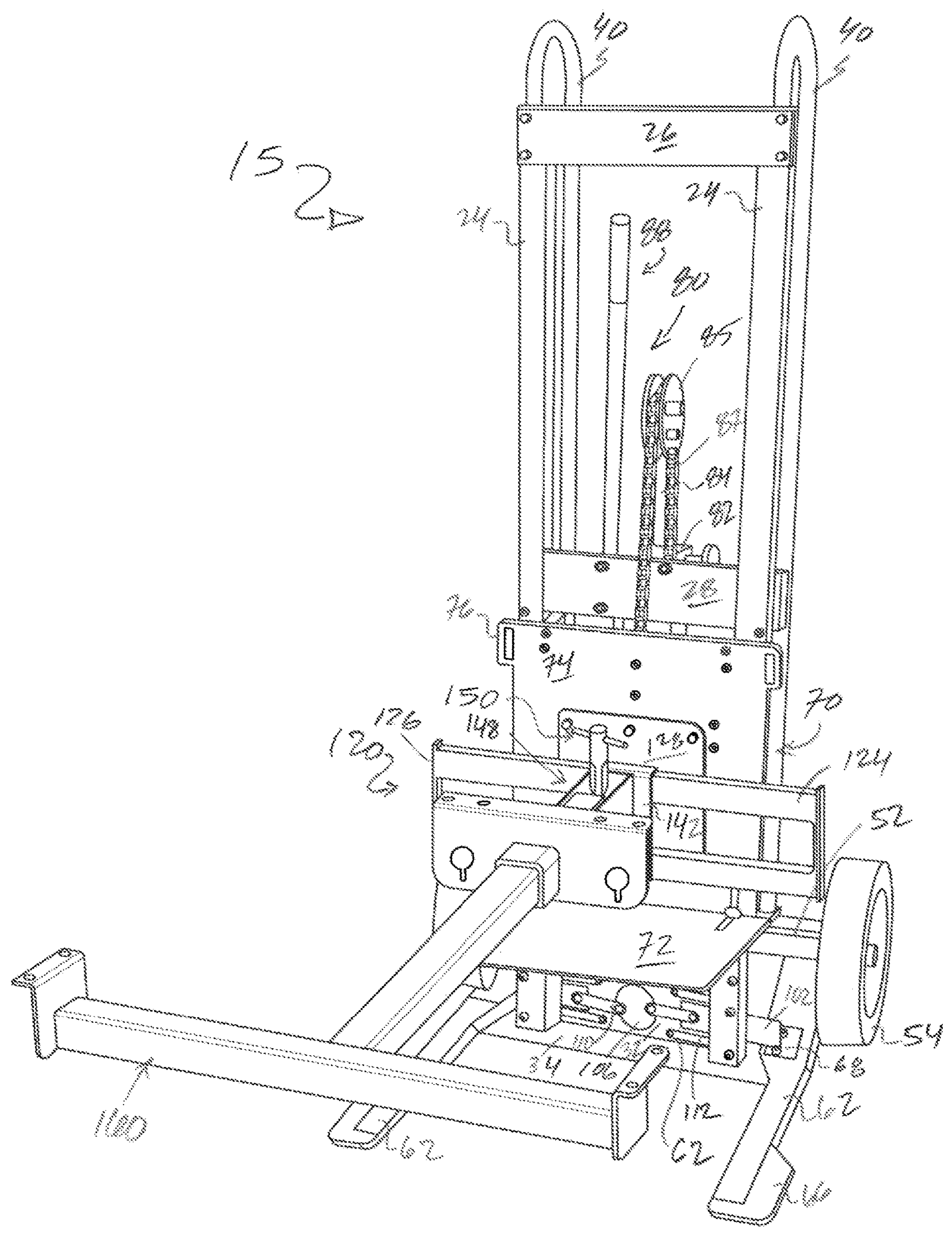

With reference to FIGS. 7 & 8, a second non-limiting accessory tool set is shown FIG. 7, namely, an accessory tool 140' characterized by a bracket 142 and quick attachment hitch connector 148, featuring a pitch adjustment mechanism 150 extending therefrom, the tool in operative combination with a hitch 160 FIG. 8. As the tool of FIG. 6, this tool is likewise received upon the accessory hanger via an upper portion of a bracket thereof.

With reference to FIG. 9 a third non-limiting accessory tool set is shown, namely, an accessory tool 140" characterized by a bracket 142 and arm 144 extending therefrom, the arm including a pivotable free end segment 145. More particularly, pivotable free end segment 145 of arm 144 is indexingly pivotable and lockable in furtherance of capturing a platform load between the tool set as shown. As the tool of FIG. 6, this tool is likewise received upon the accessory hanger via an upper portion of a bracket thereof.

Figure 11:
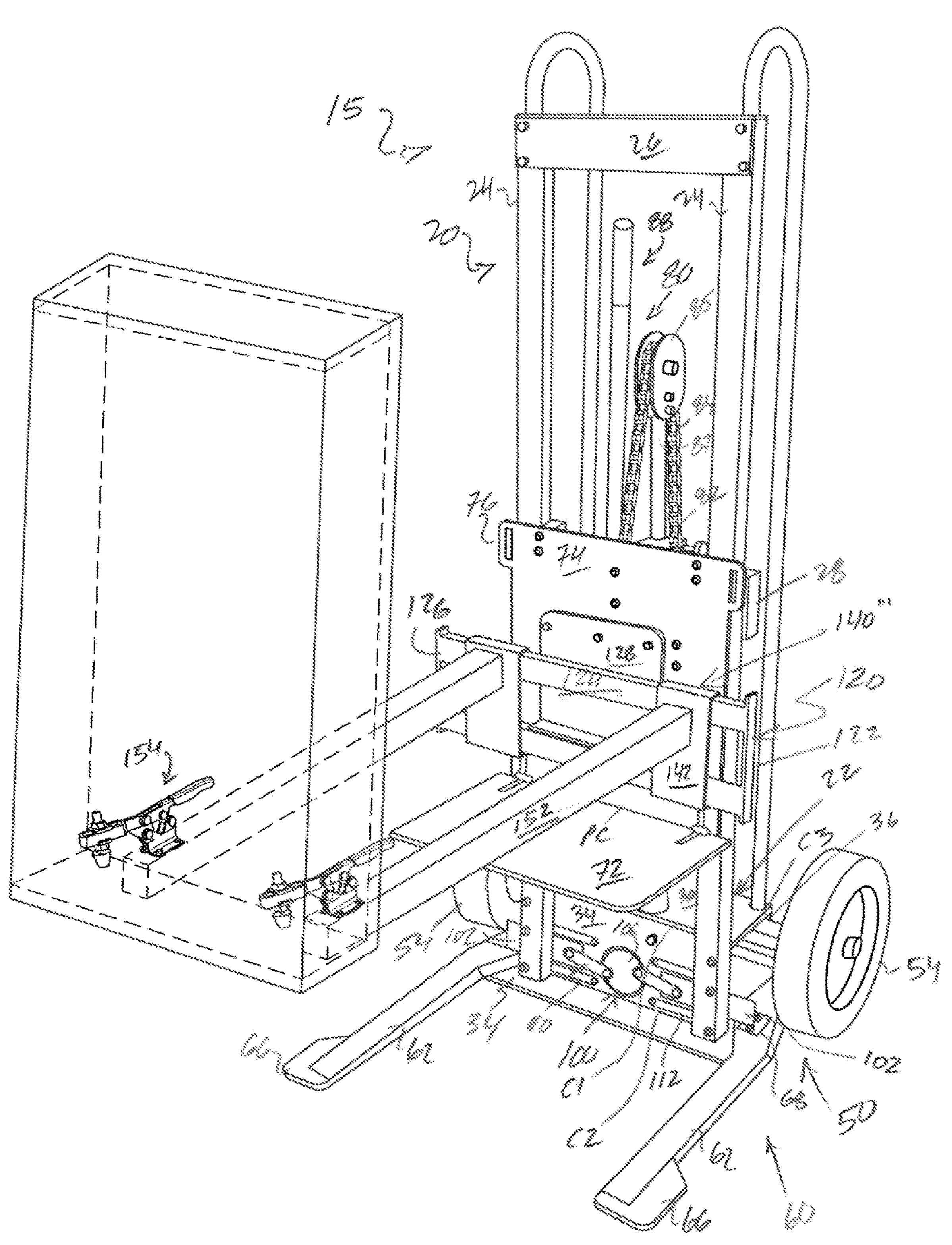

With reference to FIGS. 10 & 11, a forth non-limiting accessory tool set is shown FIG. 11, namely, an accessory tool 140'" characterized by a bracket 142 and fork 152 extending therefrom, the tool illustratively shown in operative combination with an electrical panel. Advantageously as shown FIG. 11, 152 fork is equipped/equippable with a clamp 154 to secure the load in relation thereto. As the tool of FIG. 6, this tool is likewise received upon the accessory hanger via an upper portion of a bracket thereof.

What has been described and depicted herein are preferred, non-limiting embodiments of Applicant's subject matter, along with some application contexts. Since the elements of the system and/or structures of the assemblies, subassemblies, and/or mechanisms disclosed herein may be embodied in other specific forms without departing from the spirit or general characteristics thereof, some of which forms have been indicated, the embodiments described and depicted herein/with are to be considered in all respects illustrative and not restrictive. Moreover, to the extent that nominal operational steps or sequences and/or a protocol have been set forth, and to some degree alternate work pieces and systems, assemblies, etc. with regard thereto referenced, contemplated sequences/protocols are not so limited. Accordingly, the scope of the subject invention is as defined in the language of the appended claims, and includes not insubstantial equivalents thereto.

That which is claimed:

1. A hand truck comprising:

a. a chassis characterized by a base bracket and parallel support bars longitudinally extending therefrom in spaced apart condition;

b. a wheel assembly operably depending from said base bracket of said chassis;

c. an outrigger assembly characterized by outrigger arms rotatingly supported by a portion of said wheel assembly such that said outrigger arms are reversibly pivotable between a passive outrigger assembly configuration and an active outrigger assembly configuration;

d. a platform translatably received upon said support bars of said chassis, said platform adapted to receive an accessory hanger;

e. an accessory hanger receivable upon a backer plate of said platform via apertures of said backer plate;

f. a platform lift assembly for reversibly translating said platform upon said support bars of said chassis, said platform lift assembly operatively interposed between said base bracket of said chassis and said platform.

2. The hand truck of claim 1 wherein said chassis includes a first brace bracing upper portions of said support bars, and a second brace bracing medial portions of said support bars.

3. The hand truck of claim 1 wherein said chassis includes a first brace bracing upper portions of said support bars, and a second brace bracing medial portions of said support bars, said platform lift assembly carried by said chassis via said base bracket and said second brace.

4. The hand truck of claim 1 wherein said platform lift assembly comprises a hydraulic assembly.

5. The hand truck of claim 1 wherein said platform comprises a base plate, said backer plate of said platform upwardly extending from a peripheral portion of said base plate.

6. The hand truck of claim 1 wherein said platform comprises a base plate, said backer plate of said platform translatably engaged with said support bars of said chassis.

7. The hand truck of claim 1 wherein said platform comprises a base plate, said backer plate of said platform including opposingly paired sets of channel brackets, said platform translatably received and carried upon said support bars of said chassis via said opposingly paired sets of channel brackets.

8. The hand truck of claim 1 wherein said platform comprises a base plate, said backer plate of said platform including opposingly paired sets of lined channel brackets, said platform translatably received and carried upon said support bars of said chassis via said opposingly paired sets of lined channel brackets.

9. The hand truck of claim 1 further comprising a locking mechanism for retaining said outrigger arms of said outrigger assembly in said active configuration.

10. The hand truck of claim 1 further comprising a first locking mechanism for retaining said outrigger arms of said outrigger assembly in said passive configuration, and a second locking mechanism for retaining said outrigger arms of said outrigger assembly in said active configuration.

11. The hand truck of claim 1 further comprising hand rails, said hand rails upwardly extending from upper portions of said spaced apart support bars and bendingly returning towards and to said base bracket.

12. The hand truck of claim 1 further comprising an accessory tool, said accessory tool selectively received between opposing ends of said hanger.

13. The hand truck of claim 1 further comprising an accessory tool, said accessory tool comprising any of a fork, a trailer hitch connector, or a roller, said accessory tool selectively received between opposing ends of said hanger.

14. The hand truck of claim 1 further comprising an accessory tool, said accessory tool comprising an arm selectively received between opposing ends of said hanger, said arm having an articulated a free end portion.

15. The hand truck of claim 1 further comprising an accessory tool, said accessory tool comprising a set of spaced apart forks, each fork selectively received between opposing ends of said hanger.

16. The hand truck of claim 1 further comprising an accessory tool, said accessory tool comprising a set of spaced apart forks, said forks equippable with clamps, each fork selectively received between opposing ends of said hanger.

17. A hand truck comprising:

a. a chassis characterized by a base bracket and parallel support bars longitudinally extending therefrom in spaced apart condition;

b. a wheel assembly operably depending from said base bracket of said chassis;

c. an outrigger assembly characterized by outrigger arms rotatingly supported by a portion of said wheel assembly such that said outrigger arms are reversibly pivotable between a passive outrigger assembly configuration and an active outrigger assembly configuration;

d. a locking mechanism for retaining said outrigger arms of said outrigger assembly in said passive configuration, comprises a tensioned latch;

e. a platform translatably received upon said support bars of said chassis, said platform adapted to receive an accessory hanger; and, f. a platform lift assembly for reversibly translating said platform upon said support bars of said chassis, said platform lift assembly operatively interposed between said base bracket of said chassis and said platform.

18. A hand truck comprising:

a. a chassis characterized by a base bracket and parallel support bars longitudinally extending therefrom in spaced apart condition;

b. a wheel assembly operably depending from said base bracket of said chassis;

c. an outrigger assembly characterized by outrigger arms rotatingly supported by a portion of said wheel assembly such that said outrigger arms are reversibly pivotable between a passive outrigger assembly configuration and an active outrigger assembly configuration;

d. a locking mechanism for retaining said outrigger arms of said outrigger assembly in said active configuration, said locking mechanism comprising locking bars for translated engagement with the deployed outrigger arms, said locking bars operatively linked to a rotatable shaft;

e. a platform translatably received upon said support bars of said chassis, said platform adapted to receive an accessory hanger; and, f. a platform lift assembly for reversibly translating said platform upon said support bars of said chassis, said platform lift assembly operatively interposed between said base bracket of said chassis and said platform.

* * * * *